United States Patent [19]

Nakagawa

[11] Patent Number: 4,532,621
[45] Date of Patent: Jul. 30, 1985

[54] DEVICE AND METHOD FOR RECORDING INFORMATION ON A DISK

[75] Inventor: Akira Nakagawa, Yokohama, Japan

[73] Assignee: Tokyo Shibaura Denki Kabushiki Kaisha, Kawasaki, Japan

[21] Appl. No.: 388,507

[22] Filed: Jun. 14, 1982

[30] Foreign Application Priority Data

Jun. 18, 1981 [JP] Japan .................................. 56-94428

[51] Int. Cl.³ .............................................. G11B 7/00
[52] U.S. Cl. ...................................... 369/111; 369/59; 369/124
[58] Field of Search ................... 369/111, 59, 124, 47, 369/48; 358/342, 337

[56] References Cited

U.S. PATENT DOCUMENTS

| | | | |
|---|---|---|---|
| 3,939,302 | 2/1976 | Kihara | 369/48 |
| 3,962,688 | 6/1976 | Westerberg | 369/111 |
| 3,980,818 | 9/1976 | Browning | 369/59 |
| 4,067,044 | 1/1978 | Maeda | 369/111 |
| 4,142,210 | 2/1979 | Otobe | 369/111 |
| 4,157,568 | 6/1979 | Ohki | 369/111 |
| 4,223,349 | 9/1980 | Dakin | 369/50 |
| 4,228,326 | 10/1980 | Dakin | 369/50 |
| 4,338,683 | 7/1982 | Furukawa | 369/59 |

Primary Examiner—Alan Faber
Attorney, Agent, or Firm—Cushman, Darby & Cushman

[57] ABSTRACT

A disk recording device of the invention has a detector for detecting the position of an optical head with respect to the radial direction of a disk, using an optical scale, and a position signal processing circuit for generating a position signal from the output signal from the detector. An output signal from the circuit is converted by a D/A converter into a voltage signal, which is supplied to a voltage controlled oscillator. The oscillator generates a frequency signal. The frequency signal is supplied to a page buffer storing video data and one input of an AND circuit. The other input of the AND circuit is connected to receive a video data from the page buffer. The AND circuit generates a logic product of the frequency signal and the video data, or a recording timing signal having a frequency which is proportional to the position of the head with respect to the radial direction of the disk.

8 Claims, 7 Drawing Figures

FIG. 1
(PRIOR ART)
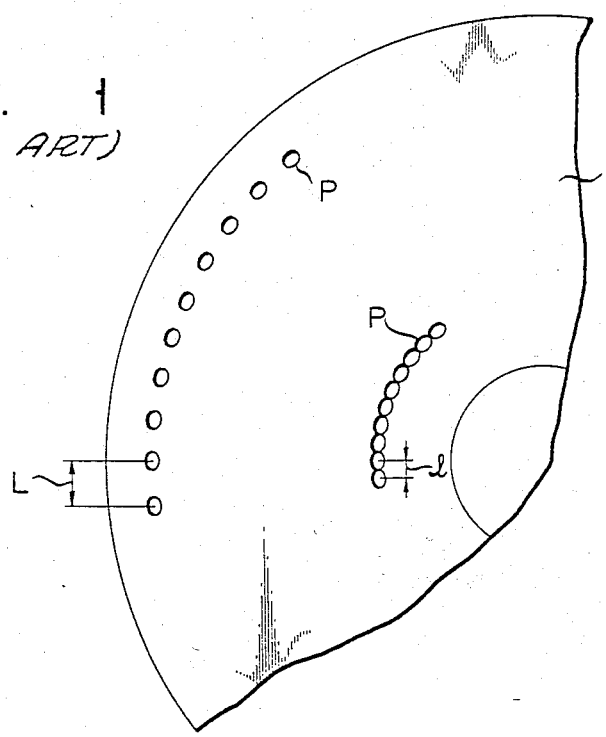
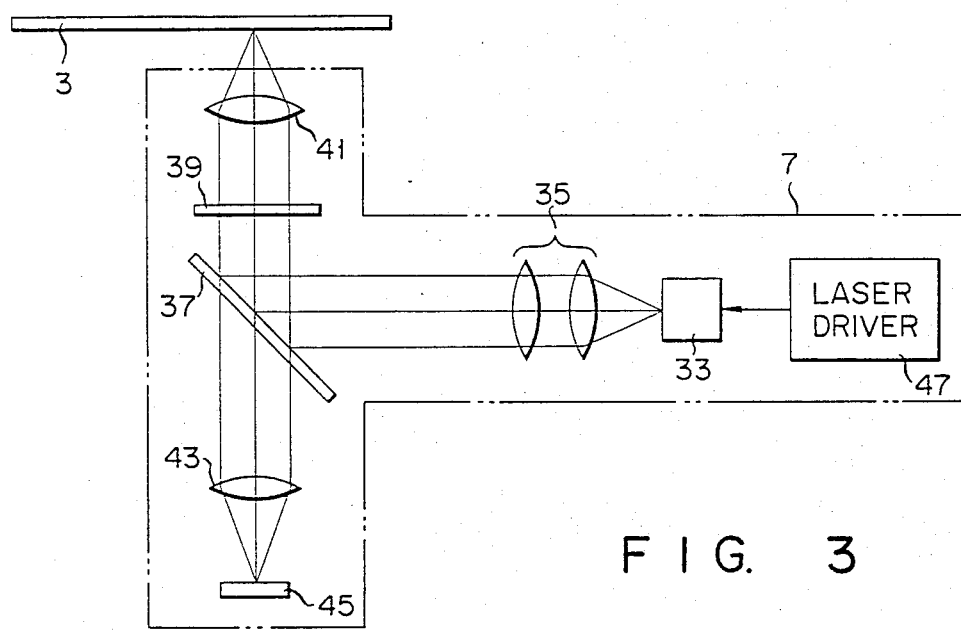
FIG. 3

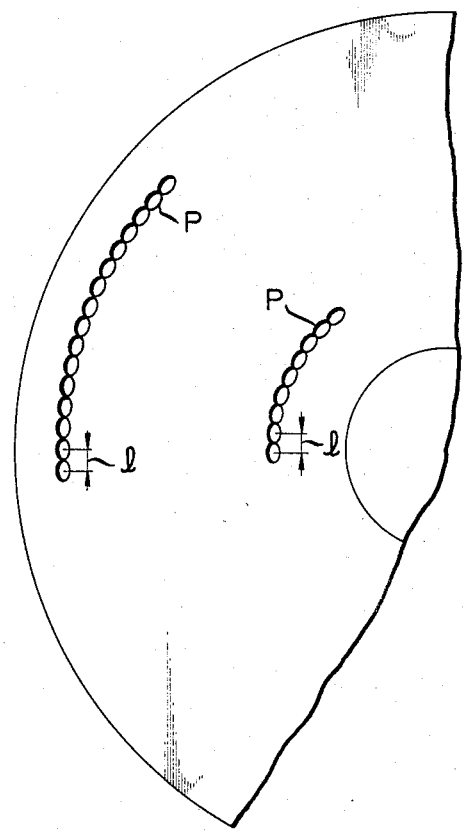
FIG. 4
FIG. 5A  OUTPUT SIGNAL FROM VCO 23
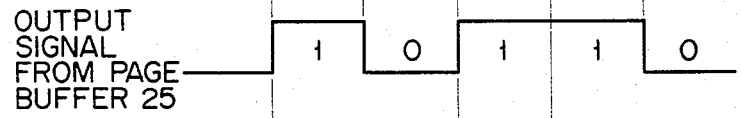
FIG. 5B  OUTPUT SIGNAL FROM PAGE BUFFER 25
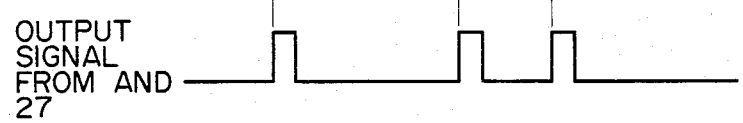
FIG. 5C  OUTPUT SIGNAL FROM AND 27

DEVICE AND METHOD FOR RECORDING INFORMATION ON A DISK

BACKGROUND OF THE INVENTION

The present invention relates to a device for recording information on a disk such as an optical disk in a concentric or spiral manner.

Recently, there has been developed an image information storing and retrieving device. In the device image information such as documents prepared in a mass are photoelectrically converted by a two-dimensional scanning. These photoelectrically converted image information are stored in or retrieved from an image information storage device in order to reproduce and output them as hard or soft copies. An optical disk device has been developed for an image information storage device adopted in such an image information storing/retrieving device.

In such an optical disk device, documents to be stored are scanned by a two-dimensional scanning device with a scanning laser beam. Video signals from the two-dimensional scanning are frequency modulated to produce FM signals, by which laser beam for storing information is turned on and off to produce modulated beam. By this modulated beam, the spinning optical disk is scanned on its metal coated surface and along its spiral track. As a result, the metal coated surface is melted and deformed in accordance with the modulated beam thereby forming a string of pits. Image information are thus recorded as a spiral track-shaped string of pits.

When video signals thus recorded are to be reproduced, the recorded track is scanned by laser beam while the disk is spinning. Modulated reflected light is detected from the pits on the recorded track and is photoelectrically converted to FM signals, which are demodulated to video signals, from which image information are reproduced. When recording information using such recording method as described above, linear velocity is different between inner and outer tracks of the optical disk. When recording is carried out at the innermost track of the optical disk by means of record timing signals having such frequency as keeping the pit distance smallest, therefore, the pit distance becomes larger at the outermost track thereof to lower its recording density. When the smallest pit distance is 1 at the innermost track of an optical disk 1 as shown in FIG. 1, for example, the pit distance becomes largest L at the outermost track thereof. To overcome the above drawback, there has been provided a method for making recording frequency constant and changing the spinning frequency of the disk, so that linear velocity may be kept constant at inner and outer tracks of the disk to achieve recording at the smallest pit distance along all the tracks. According to this method, however, the spinning frequency of the optical disk must be changed proportional to its radial position, thus causing the motor control circuit for controlling the optical disk driving motor to be complicated and taking a long time until the spinning frequency of the optical disk is settled.

SUMMARY OF THE INVENTION

An object of the present invention is to provide a device and method for recording information on a disk wherein the disk is rotated at a constant speed to generate record timing signals having frequencies proportional to the radial position of the disk, and information is recorded synchronized with the record timing signals.

According to the device and method for recording information on a disk of the present invention makes it unnecessary to change the spinning frequency of the optical disk for every track, thus enabling the motor control circuit to be made simpler and the access time to be shorter.

To achieve the above object, there is provided a device for recording information on a disk in a concentric or spiral manner comprising motor 5 for rotating the disk 3 at a constant speed; a head 7 for recording and/or reproducing information on and from the spinning disk 3; a position detector means 17 connected to the head 7 for detecting the position of head 7; a position signal generator 19 electrically connected to the position detector means 17 for generating positional signals; a record timing signal generating means 28 electrically connected to the position signal generator for generating record timing signals having frequencies proportional to the radial position of disk; wherein the head 7 is electrically connected to the record timing signal generating means 28 and information are recorded and/or reproduced synchronizing with the record timing signals.

BRIEF DESCRIPTION OF THE DRAWINGS

These and other objects, features and advantages of the invention will, in part, be pointed out with particularity, and will, in part, become obvious from the following description of the invention, taken in conjunction with the accompanying drawings which form an integral part thereof, in which:

FIG. 1 shows an example of recording information on an optical disk using a conventional technique;

FIG. 3 is a detailed block diagram showing the optical head in FIG. 2;

FIG. 4 shows an example of recording information on a disk in the embodiment shown in FIG. 2; and FIGS. 5A through 5C show timing signals generated in the embodiment shown in FIG. 2, in which FIG. 5A shows an output signal of a voltage controlled oscillator, FIG. 5B an output signal of a page buffer, and FIG. 5C an output signal of an AND circuit.

DETAILED DESCRIPTION OF THE PREFERRED EMBODIMENT

Figure 2:
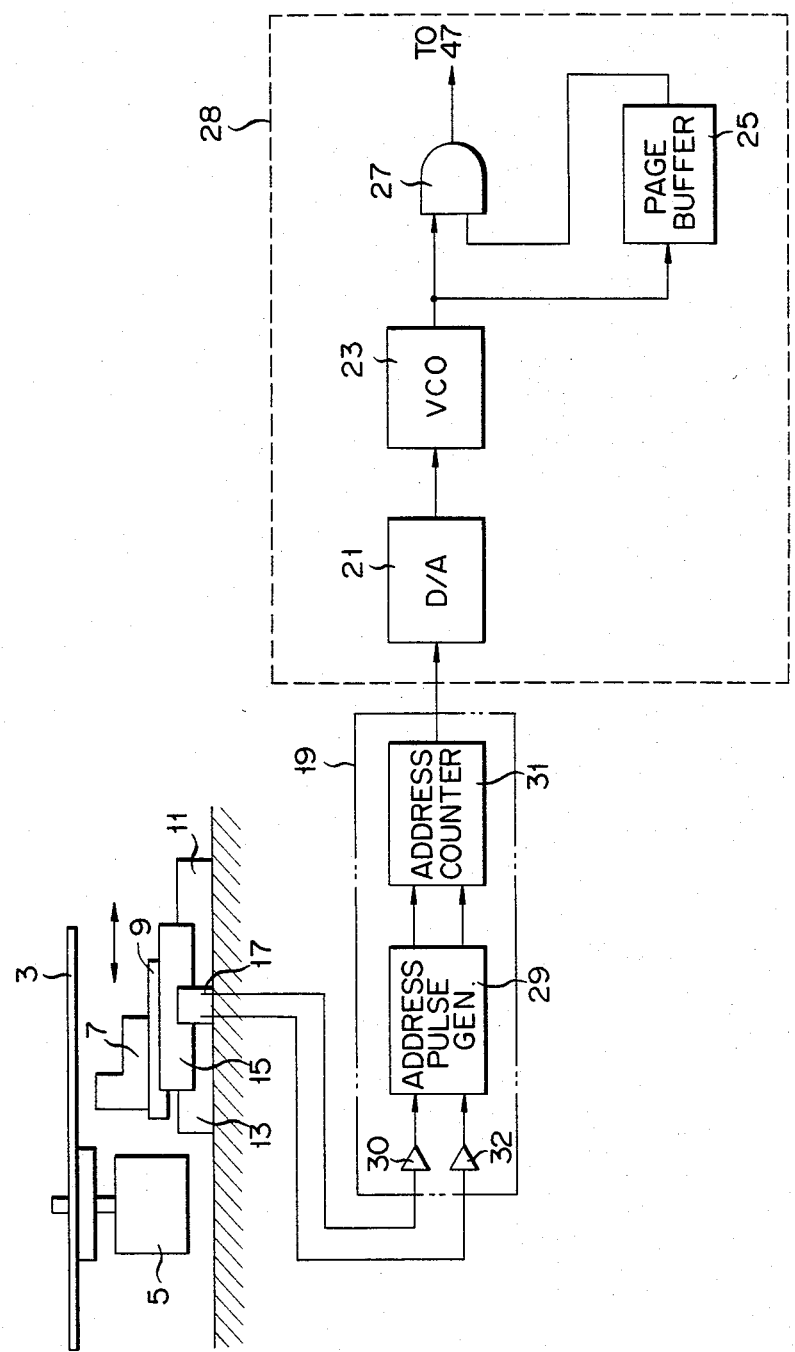
FIG. 2 is a block diagram showing an embodiment of the present invention.

As shown in FIG. 2, an optical disk 3 is rotated by a motor 5. Below the optical disk 3 there is provided a recording/reproducing optical head 7. Below the head 7 there is disposed a DC linear motor 13 which comprises a movable section 9 and a fixed section 11. The head 7 is fixed to the movable section 9. The head 7 may be moved by the linear motor 13 in the radial direction of the optical disk 3. On the movable section 9 an optical scale 15 is secured.

The position of the optical scale 15 is detected by the so-called "superposed lattice detection system". The system comprises a detector 17 and a position signal processing circuit 19. The circuit 19 comprises two preamplifiers 30 and 32, an address pulse generator 29 and an address counter 31.

The detector 17 is so designed as to generate two output signals of different phases. It generates a first output signal when it detects the scale 15 while the head 7 is moving toward the circumference of the optical disk 3. It generates a second output signal when it detects the scale 15 while the head 7 is moving toward the center of the optical disk 3. The first output signal is supplied to the preamplifier 30 through a line 18. The second output signal is supplied to the preamplifier 32 through a line 20. The outputs of both preamplifiers are supplied to the address pulse generator 29. The generator 29 generates an up-count signal when it receives the output from the prCeamplifier 30. It generates a down-count signal when it receives the output from the preamplifier 32. Both the up-count signal and the down-count signal are supplied to the address counter 31. Upon reaching a predetermined count, the address counter 31 generates a position signal, which is supplied to a circuit 28 for generating a recording timing signal having a frequency which corresponds to the position of the head 7.

The circuit 28 comprises a D/A converter 21, a voltage controlled oscillator (VCO) 23, a page buffer 25 and an AND circuit 27. The D/A converter 21 is connected to receive a position signal from the address counter 31. Upon receiving a position signal, the D/A converter 21 converts the signal into a voltage analog signal, which is supplied to the VCO 23. The VCO 23 produces such a recording timing signal as shown in FIG. 5A. The recording timing signal has a frequency which is proportional to the voltage analog signal from the D/A converter 21. The recording timing signal is supplied to the input of the page buffer 25 and one input of the AND circuit 27. In synchronism with the output from the VCO 23 the page buffer 25 supplies such a data as shown in FIG. 5B to the other input of the AND circuit 27. The AND circuit 27 therefore generates a logic product of the data from the page buffer 25 and the recording timing signal from the VCO 23.

As shown in FIG. 3, the optical head 7 comprises a semiconductor laser oscillator 33, a laser driver 47, a lens system 35, a deflection beam splitter 37, a quarter-wave plate 39, an objective lens 41, a convex lens 43 and a photodetector 45. When driven by the laser driver 47, the laser oscillator 33 emits a laser beam. The laser beam is focused by the objective lens 41 onto the optical disk 3. The photodetector 45 is so positioned as to receive a laser beam reflected from the optical disk 3. The laser oscillator 33 may emit an intense recording laser beam or a less intense reproducing laser beam, according to the power supplied to the laser driver 47. The laser driver 47 drives the oscillator 33 during the recording period in response to the pulse signal from the AND circuit 27.

Now it will be described how the device operates. In order to record data on the outermost track of the optical disk 3, the motor 5 rotates the optical disk 3 at a constant speed. While the optical disk 3 is spinning, the optical head 7 is moved to the outermost track of the optical disk 3. The detector 17 generates a position signal when the optical scale 15 passes by it. The position signal is supplied to the position signal processing circuit 19. The address pulse generator 29 of the circuit 19 receives the position signal and generates pulses one after another. These pulses are supplied as up-count signals to the address counter 31. Upon reaching the predetermined count, the address counter 31 generates a position signal. The position signal is supplied to the D/A converter 21 of the circuit 28. The D/A converter 21 converts the position signal into a voltage analog signal, which is supplied to the voltage controlled oscillator 23. The oscillator 23 generates a recording timing signal which has a frequency corresponding to the voltage analog signal. The recording timing signal is supplied to the page buffer 25. In synchronism with the recording timing signal the page buffer supplies data one after another. These data are supplied to the AND circuit 27, which receives also the recording timing signal from the voltage control oscillator 23. The AND circuit 27 therefore outputs the logic product of the input data and the input signal, in the form of a string of pulses. The pulses are supplied to the laser driver 47. In response to these pulses the laser driver 47 causes the laser oscillator 33 to emit a recording laser beam. The recording laser beam is applied onto the optical disk 3 through the lens system 35, the beam splitter 37, the quarter-wave plate 39 and the objective lens 41, thereby ablating a string of pits P in the outermost track. These pits P correspond to the pulses generated by the AND circuit 27. As shown in FIG. 4, the intervals at which the pits P are ablated are equal to those at which other pits are arranged in any inner track. That is, the intervals are l, i.e. the minimum pit interval.

To ablate pits P in any other track of the optical disk 3, a string of pulses are generated by the AND circuit 27 from a position signal which is supplied from the detector 17 and which represents the position of the optical scale 15. The pits P thus made are arranged at minimum pit intervals l, too.

The embodiment described above is an optical disk recording device. The present invention is not limited to an optical disk recording device, however. It may be applied to other disk devices such as a magnetic disk device, achieving the same effects as mentioned above.

Many changes and modifications in the above embodiment can, of course, be carried out without departing from the scope of the invention. That scope, therefore, is intended to be limited only by the scope of the appended claims.

What is claimed is:

1. A disk recording device for recording data on concentric circular or spiral tracks of a disk, comprising:
    (a) a motor for rotating said disk at a constant speed;
    (b) a head for recording data on or reproducing data from said rotating disk;
    (c) position detecting means, operatively associated with said head, for detecting position of said head relative to said disk;
    (d) position signal generating circuit means, electrically associated with said position detecting means, for generating a position signal; nad
    (e) recording timing signal generating means, electrically associated with said position signal generating circuit means, for generating a recording timing signal of a train of pulses having intervals such that resulting recording density based thereon is constant at any radial position on said disk; wherein
    said head is electrically connected to said recording timing signal generating means for recording or reproducing data in synchronism with said recording timing signal.

2. A disk recording device according to claim 1, wherein said recording timing signal generating means comprises:
    signal converting means for converting said Position signal from said position signal generating circuit means into a voltage signal;
    signal generating means electrically connected to said signal converting means for generating a signal which has a frequency proportional to said voltage signal;

video data buffer means, electrically connected to said signal generating means, for outputting video data by using said signal from said signal generating means as a timing signal; and video data output means, electrically connected to said signal generating means and said video data buffer means, for outputting said video data in synchronism with said signal from said signal generating means.

3. A disk recording device according to claim 2, wherein said signal converting means is a digital/analog converter.

4. A disk recording device according to claim 2, wherein said signal generating means is a voltage controlled oscillator.

5. A disk recording device according to claim 2, wherein said video data output means is an AND circuit.

6. A disk recording device according to claim 1, 2, 3, 4 or 5, wherein said disk is an optical disk.

7. A method of recording data on concentric circular or spiral tracks, using a disk recording device having a disk, a motor for rotating the disk at a constant speed, a head for recording data on or reproducing data from the rotating disk, position detecting means for detecting the position of the head relative to the disk and a position signal processing circuit electrically connected to the position detecting means for generating a position signal, said method comprising the steps of:

(a) generating a recording timing signal having a frequency which is proportional to the radial position of the head with respect to the disk; and (b) recording data on the disk in synchronism with the recording timing signal, thereby recording the data at a constant density at any radial position on the disk.

8. A method of recording data according to claim 7, wherein said disk is an optical disk.

* * * * *